United States Patent
Hettich et al.

(10) Patent No.: US 8,430,617 B2
(45) Date of Patent: Apr. 30, 2013

(54) SCREW ANCHOR FOR FASTENING ADD-ON PARTS IN CONCRETE OR BRICKWORK

(75) Inventors: Stefan Hettich, Schramberg (DE); Ulrich Hettich, Schramberg (DE)

(73) Assignee: Ludwig Hettich & Co., Schramberg-Sulgen (DE)

( * ) Notice: Subject to any disclaimer, the term of this patent is extended or adjusted under 35 U.S.C. 154(b) by 346 days.

(21) Appl. No.: 12/677,247

(22) PCT Filed: Sep. 9, 2008

(86) PCT No.: PCT/EP2008/007377
§ 371 (c)(1),
(2), (4) Date: May 13, 2010

(87) PCT Pub. No.: WO2009/033637
PCT Pub. Date: Mar. 19, 2009

(65) Prior Publication Data
US 2010/0290858 A1    Nov. 18, 2010

(30) Foreign Application Priority Data

Sep. 10, 2007   (DE) .......................... 10 2007 042 977

(51) Int. Cl.
*F16B 35/00* (2006.01)

(52) U.S. Cl.
USPC ......................................... 411/383; 411/411

(58) Field of Classification Search ................. 411/411, 411/386, 387.4, 383, 178, 424, 479
See application file for complete search history.

(56) References Cited

U.S. PATENT DOCUMENTS

| | | | |
|---|---|---|---|
| 240,780 A * | 4/1881 | Smith | 74/458 |
| 368,372 A * | 8/1887 | Bingham | 285/298 |
| 534,164 A * | 2/1895 | Larsh | 269/220 |
| 1,181,971 A | 5/1916 | Lovell | |
| 2,520,232 A | 8/1950 | Bohdan | |
| 2,585,304 A * | 2/1952 | Evans et al. | 403/241 |
| 5,636,549 A * | 6/1997 | Devenyi | 74/424.75 |
| 5,961,266 A * | 10/1999 | Tseng | 411/383 |
| 6,599,072 B1 * | 7/2003 | Gerhard | 411/387.4 |
| 7,465,136 B2 * | 12/2008 | Nagayama | 411/178 |
| 2004/0258502 A1 | 12/2004 | Unsworth et al. | |

FOREIGN PATENT DOCUMENTS

| | | |
|---|---|---|
| AU | 498019 B2 | 2/1979 |
| DE | 51016 | 7/1889 |
| DE | 812487 C | 8/1951 |
| DE | 2311500 A1 | 8/1974 |
| DE | 8713708 U1 | 11/1987 |
| DE | 19543317 A1 | 5/1997 |
| DE | 19841135 A1 | 4/1999 |
| DE | 20115113 U1 | 11/2001 |
| DE | 202005015860 U1 | 12/2005 |
| DE | 102006003172 A1 | 7/2007 |
| FR | 2341059 A1 | 9/1977 |

OTHER PUBLICATIONS

The International Bureau of WIPO, International Preliminary Report on Patentability in related International Application ser. No. PCT/EP2008/007377, report date Apr. 7, 2010, p. 1-7.

* cited by examiner

*Primary Examiner* — Flemming Saether
(74) *Attorney, Agent, or Firm* — Duane Morris LLP

(57) ABSTRACT

A screw anchor for fastening add-on parts in concrete or brickwork comprising a shaft (10), which encompasses a thread, is characterized in that the external thread is embodied at a spiral (15), which is embodied separately from the shaft (10) and in that the spiral is connected to the outer periphery of the shaft in a positive manner.

6 Claims, 3 Drawing Sheets

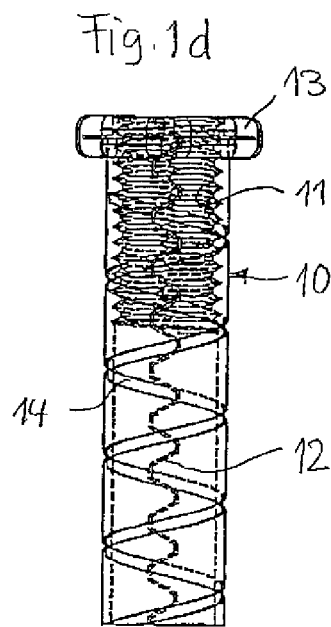
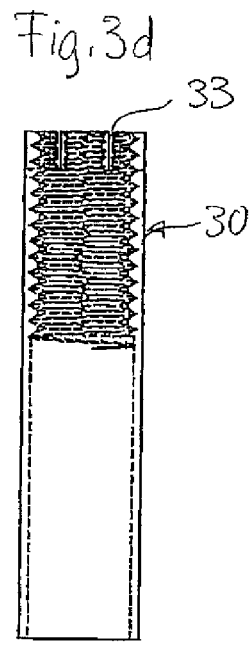
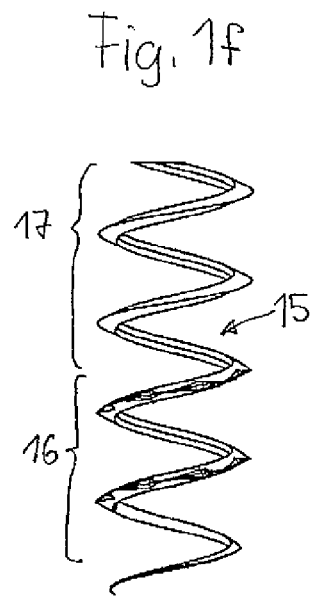
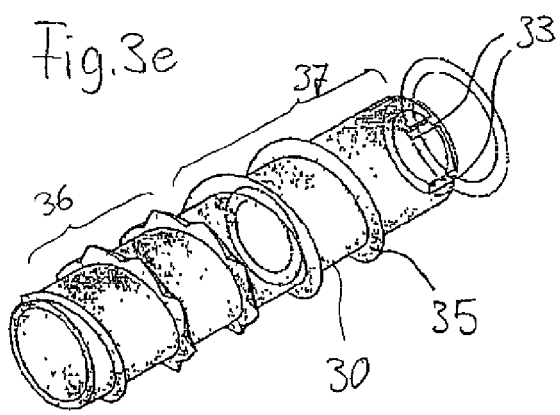
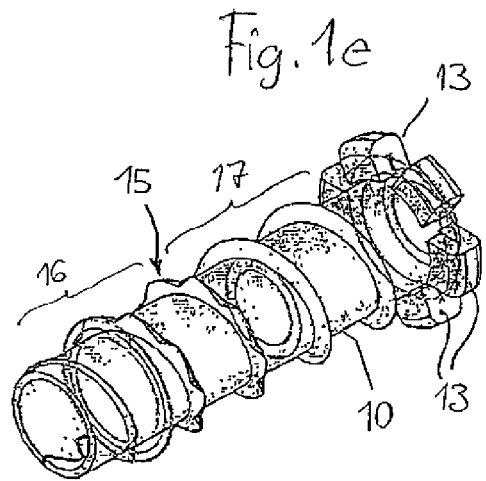

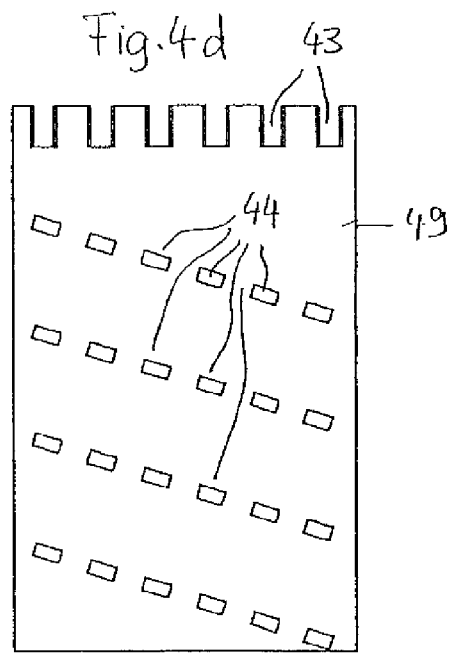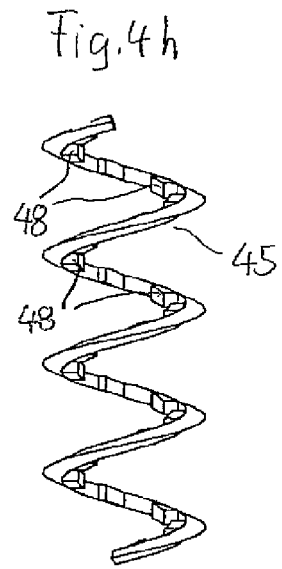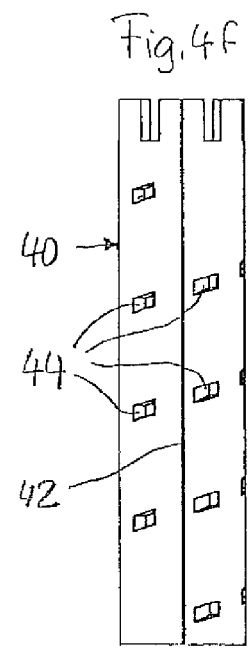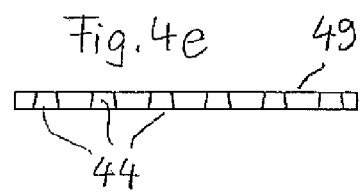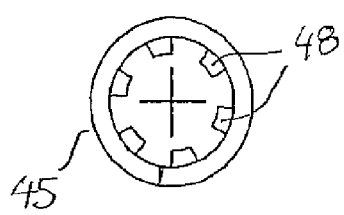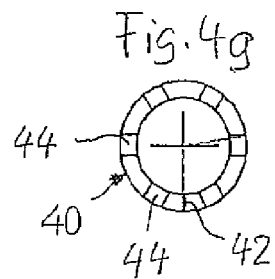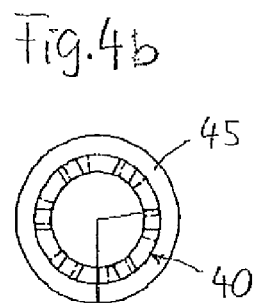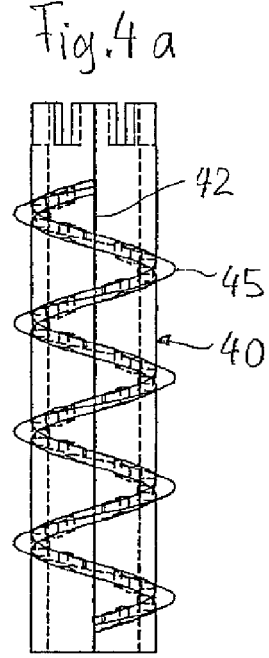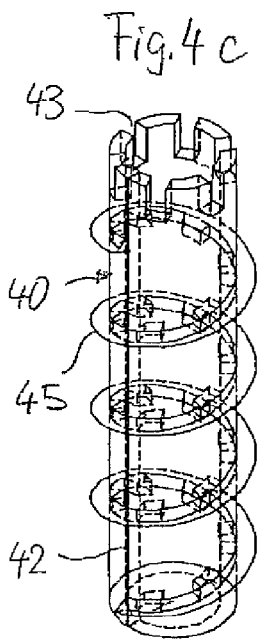

SCREW ANCHOR FOR FASTENING ADD-ON PARTS IN CONCRETE OR BRICKWORK

BACKGROUND

The invention relates to a screw anchor for fastening add-on parts in concrete or brickwork by means of a shaft, which encompasses a thread. Such a screw anchor is known from DE 10 2006 003 172 A1, for example.

As a general rule, a screw anchor is a one-piece component, in the case of which the thread is rolled onto the shaft of the screw anchor as external thread. The thread is to have a very high degree of hardness, so as to provide for a problem-free grooving of an internal thread into a pre-drilled hole in concrete or brickwork. Steel, which can be hardened and which has high carbon content, can thus be used as material. Such steels can only be recast with difficulty. The thread rolling thus proves to be very expensive.

In the assembled state, the shaft of the screw anchor supports high loads and is thereby permanently stressed so as to be subjected to tension and bending. Ductile, low carbon construction steel is considered here as material.

In the event that a corrosive attack is to be expected, as in the case of applications of the screw anchor in the outside caused by climatic influences, corrosion-resistant steel is to be used.

The mentioned demands are partly conflictive and can thus only be fulfilled by means of very few, expensive materials.

A screw anchor comprising a shaft, the external thread of which is formed by a first spiral, which is wound onto the smooth outer periphery of the shaft, is known from U.S. Pat. No. 1,181,972, wherein a constant distance between the coils of the first spiral from a second spiral, which is also wound unto the smooth outer periphery of the shaft and which has a lower degree of thickness than the first spiral, is ensured.

The invention is thus based on the object of embodying a screw anchor of the afore-described type in such a manner that it can optimally fulfill the demands during operation in response to reduced production costs of each of its parts.

Thanks to the division of the screw anchor into two parts according to the invention, namely into the load-accommodating shaft on the one hand and into the thread forming spiral on the other hand, materials can be chosen for the production of these two parts, which are in each case optimally adapted to the specific demands, so that these demands can be optimally fulfilled, without having to make the compromise, which is currently required and which was a sequel of selecting a single material for the screw anchor. Surprisingly, the production is also simplified, because a thread rolling of a material, which is difficult to shape, becomes unnecessary.

According to the invention, the spiral is connected to the outer periphery of the shaft in a positive manner, for example an embodiment, in which protrusions at one part, e.g. the spiral, interact in a positive manner with recesses at the other part, e.g. at the shaft.

In another type of positive connection, the spiral is inserted into a spiral groove, which is prefabricated to the periphery of the shaft.

The positive connection according to the invention does not require any additional parts or expensive operating processes for establishing the connection.

In the event that a corrosive attack is not to be expected, the shaft can consist of a material comprising high tensile strength, flexural strength and fatigue strength, such as common construction steel and the spiral can consist of a material comprising a high degree of hardness, such as hardenable steel comprising a high carbon content.

In the event that provision is made for use of the screw anchor in the outside, where corrosive attack is to be expected due to changing climatic influences, the shaft can preferably consist of a corrosion-resistant material, such as corrosion-resistant steel, and the spiral can be embodied in two parts, namely comprising a cutting part, which consists of two or three coils and of a material having a high degree of hardness, such as a steel comprising a high carbon content, and comprising a supporting part consisting of a corrosion-free spring steel.

The invention can also be applied to a screw comprising a shaft and internal thread, in the case of which the internal thread is formed by means of a separate spiral, which can be inserted into a blind hole or clearance hole in the shaft and which can be fastened in a similar manner as described above, e.g. in a spiral groove at the inner periphery of the blind hole.

The invention will be explained below more extensively at hand of schematic drawings of exemplary embodiments comprising further details.

BRIEF DESCRIPTION OF THE DRAWINGS

FIG. 4 shows a fourth embodiment of the invention, namely
  FIG. 4a a side view,
  FIG. 4b a front view,
  FIG. 4c a perspective view of a completely assembled screw anchor according to the fourth embodiment,
  FIG. 4d a blank of a sheet metal provided with punched holes for the fourth embodiment,
  FIG. 4e a front view of such blank of a sheet metal,
  FIG. 4f a state of such blank of a sheet metal, which is bent to form a cylindrical shaft in a side view,
  FIG. 4g a front view of the cylindrical shaft,
  FIG. 4h a spiral, which is used in the fourth embodiment in a side view and
  FIG. 4i a front view of the spiral.

DETAILED DESCRIPTION

Figure 1A:
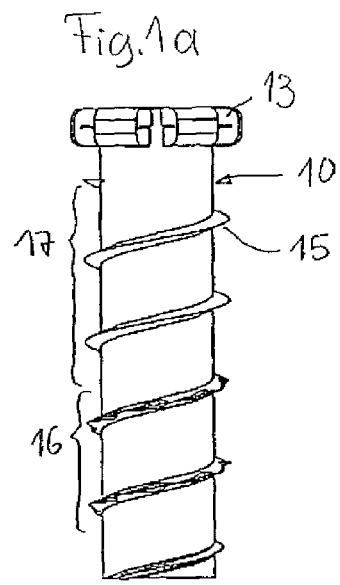
FIGS. 1 to 3 show three embodiments of a screw anchor according to the invention, wherein
  the letter a identifies in each case a side view,
  the letter b identifies in each case a front view,
  the letter c identifies in each case an axial section according to lines I-I, II-TI or III-III, respectively, in the figures identified accordingly with b in each case through the respective completely assembled screw anchor consisting of shaft and spiral,
  the letter d identifies in each case an axial section through the shaft alone, which belongs to the first and third embodiment,
  the letter e identifies a perspective illustration in each case of the first and third embodiment of a completely assembled screw anchor according to the invention, and
  the letter f identifies a side view of a spiral used in the mentioned three embodiments.

By means of FIGS. 1a to 1f, a first embodiment of the invention shall now be described. FIGS. 1a to 1c and 1e thereby show a completely assembled screw anchor and FIGS. 1d and 1f show views of the individual components thereof, namely of a shaft (FIG. 1d) and of a spiral, which is to be fastened thereon (FIG. 1f).

The screw anchor according to FIG. 1 has a hollow shaft 10 comprising an internal thread 11 for screwing in a non-illustrated screw for mounting an add-on part, which is also not illustrated. The shaft 10 is bent from a blank of a sheet metal into the shown cylindrical form and is joined to form a zigzag-shaped joint 12 by means of its V-shaped serrated edges and is held in this state by a flanged head comprising star-shaped lugs 13. A spiral groove 14 is molded into the outer periphery of the shaft 10, as can best be seen from FIG. 1d.

A correspondingly profiled and wound spiral 15, which is separately illustrated in FIG. 1f, engages with this spiral groove 14. The spiral has a toothed cutting part 16, which extends across two to three coils of the spiral, as well as a toothless supporting part 17, which extends across the remainder of the spiral (see FIG. 1f and FIG. 1e). The two parts can consist of two separate parts (not illustrated) made from different materials, namely the cutting part 16, which serves for thread-forming in a pre-drilled hole in concrete or brickwork and which is made from hardened steel comprising high carbon content, and the supporting part 17, which serves for load introduction of the load to be transferred from the screw anchor into the concrete and which is made of ductile, corrosion-resistant spring steel.

The blank of a sheet metal of the shaft 10 itself can also consist of steel having a high ductility and, if applicable, of a high corrosion-resistance. The spiral 15, the inner diameter of which has a small undersize relative to the outer diameter of the shaft, is pushed onto the periphery of the shaft by slightly spreading it, until its coils engage with the spiral groove 14 on the outer periphery of the shaft, so that the spiral is held on the shaft in a positive manner without the use of additional measures.

The screw anchor created from shaft 10 and spiral 15 according to the invention can be produced in a simple manner and optimally fulfills the demands on a screw anchor, due to the fact that the shaft 10 on the one hand and the spiral 15 on the other hand are in each case made from different materials, which are particularly suitable for the specific purposes thereof.

It goes without saying that instead of a hollow shaft 10, the screw anchor can also have a full shaft, which can be designed with a spiral groove for the positive connection to the spiral, likewise as in case of the first embodiment.

Figure 2A:
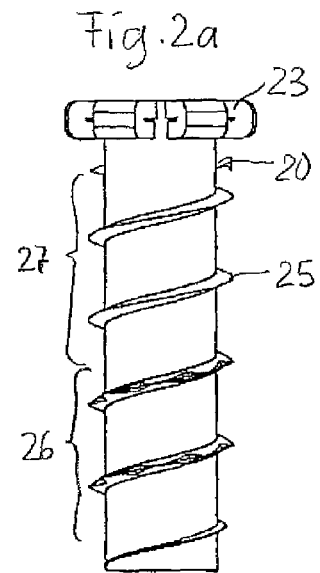
Figure 3A:
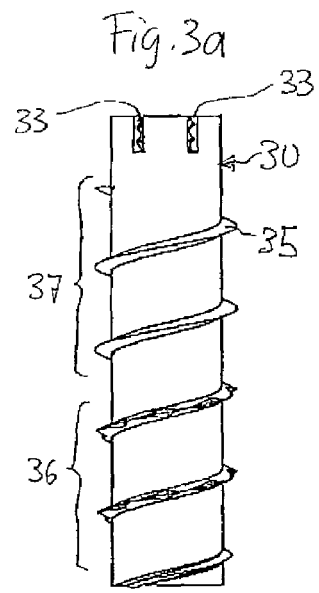
Figure 1B:
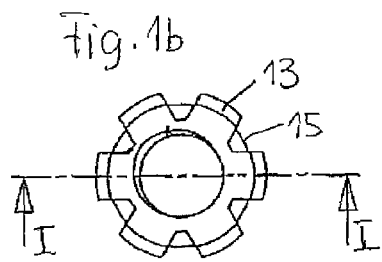
Figure 2B:
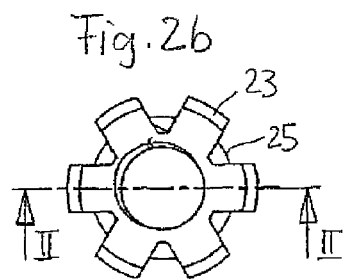
Figure 3B:
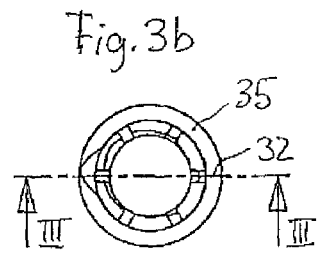
Figure 1C:
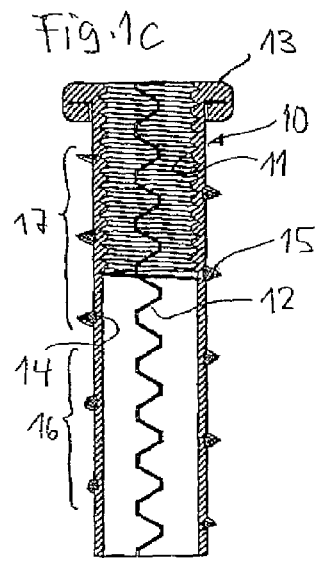
Figure 2C:
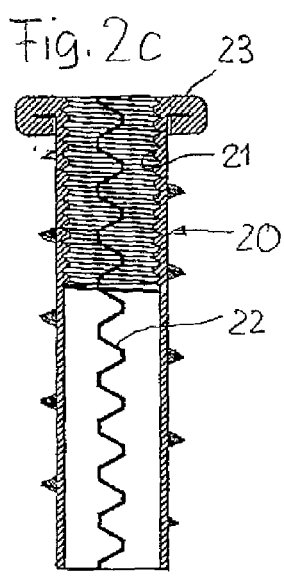
Figure 3C:
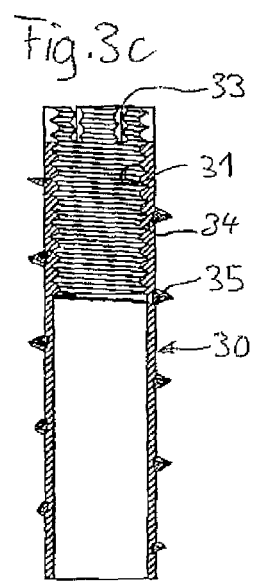

FIGS. 2a, 2b and 2c illustrate a screw anchor according to a second embodiment of the invention, which are identified by corresponding reference numerals, which are increased by the number ten, however. This second embodiment differs from the first embodiment in that the spiral 25 is not connected to the shaft 20 in a positive manner, but by means of welding or adhesion on the periphery of the shaft, which has a smooth surface. Apart from that, this screw anchor is designed so as to be virtually the same as the screw anchor of the first embodiment, so that a further description is unnecessary.

FIGS. 3a to 3e illustrate a screw anchor according to a third embodiment of the invention, wherein reference numerals, which have again be increased by the number 10 and which otherwise correspond, are used in the drawings for the same parts or parts having the same effect as in the remaining embodiments. The shaft 30 of the third embodiment does not have a head, which projects beyond the outer diameter of the spiral 35, but only axial slits 33, with which a screw tool can engage. Thus, the screw anchor can be sunk completely in the concrete or brickwork. In this case, the spiral 35 is embodied in the same manner as in the first embodiment and engages in a positive manner into a spiral groove 34 on the outer periphery of the shaft 30.

As in the two previous embodiments, the screw anchor includes in its upper area an internal thread for screwing in a mounting screw (not shown) for add-on parts.

FIGS. 1d and 3d separately show once again the shaft 10 and 30, respectively, of the first embodiment and of the third embodiment of a screw anchor according to the invention. In particular the design of the spiral groove 14 becomes clear from FIG. 1d.

FIGS. 4a, 4b and 4c show a screw anchor according to a fourth embodiment of the invention in the assembled state of the spiral 45. FIGS. 4d and 4e show the corresponding shaft in different production stages, and FIG. 4h shows the spiral 45 used in the fourth embodiment. This spiral has projections 48 arranged at even distances, which project inwardly in radial direction from their inner periphery. Starting at a blank of sheet metal (FIGS. 4d and 4e), the shaft 45 is bent into a cylindrical configuration according to FIGS. 4f and 4g, in which its two side edges meet one another in an axial joint 42. The blank of sheet metal 49 has punched holes 44a, which are arranged in slanted rows at even distances, the distances of which correspond to those of the projections 48 of the spiral 45. In the assembled state illustrated in FIGS. 4a to 4c, the projections 48 engage with the punched holes 44a, so that a positive connection is established between the spiral 45 and the shaft 40 wound from the blank of sheet metal 49.

As in the embodiment according to FIG. 3, provision is made at the top end of the blank of sheet metal 49 for slits 43, which serve for inserting a screw tool in the cylindrical state of the shaft 40.

Even though an internal thread for screwing in a mounting screw for add-on parts is not illustrated herein, it goes without saying that provision for it can also be made in this case.

The features disclosed in the above description, in the claims and in the drawings can be important for the realization of the invention in its different embodiments, either individually as well as in any combination.

The invention claimed is:

1. A screw anchor for fastening add-on parts in concrete or brickwork comprising a shaft which encompasses an external thread, formed by a spiral, which is separate from the shaft, said spiral being connected to the outer periphery of the shaft, wherein one of the spiral and the shaft, respectively, is provided with recesses arranged at regular distances and other one of the shaft and the spiral, respectively, is provided with matching projections, which engage with the recesses to prevent relative movement between the spiral and the shaft, wherein the shaft is formed from a bendable blank of sheet metal.

2. The screw anchor according to claim 1, wherein the recesses are punched into the blank of sheet metal and in that the projections provided at the spiral engage with the recesses.

3. The screw anchor according to claim 1 wherein the shaft consists of a material comprising high tensile strength, flexural strength and fatigue strength, and the spiral-consists of a material comprising a high degree of hardness.

4. The screw anchor according to claim 3, wherein the shaft comprises commons structural steel and the spiral comprises hardenable steel with a high carbon content.

5. The screw anchor according to claim 1 wherein the shaft consists of a corrosion-resistant material, and the spiral encompasses a cutting part-made of a material comprising a high degree of hardness, and a supporting part made of corrosion-resistant spring steel.

6. The screw anchor according to claim 5, wherein the shaft comprises corrosion-resistant steel and the cutting part made of steel with a high carbon content.

* * * * *